(12) United States Patent
Gupta et al.

(10) Patent No.: US 6,964,484 B2
(45) Date of Patent: Nov. 15, 2005

(54) OVERFILL REDUCTION FOR AN OPTICAL MODULATOR

(75) Inventors: Anurag Gupta, Corvallis, OR (US); Peter Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/770,069

(22) Filed: Feb. 2, 2004

(65) Prior Publication Data

US 2005/0168704 A1    Aug. 4, 2005

(51) Int. Cl.[7] ............... G03B 21/14; G03B 21/28; G02B 26/08
(52) U.S. Cl. .................. 353/69; 353/81; 359/207
(58) Field of Search .................. 353/38, 46, 81, 353/69; 359/210, 668, 669, 670, 207, 211

(56) References Cited

U.S. PATENT DOCUMENTS

| | | | |
|---|---|---|---|
| 4,017,160 A * | 4/1977 | Betensky | 359/669 |
| 4,770,507 A * | 9/1988 | Arimoto et al. | 359/669 |
| 5,159,485 A | 10/1992 | Nelson | |
| 5,844,588 A | 12/1998 | Anderson | |
| 5,860,721 A | 1/1999 | Bowron et al. | |
| 5,953,153 A | 9/1999 | Conner et al. | |
| 6,419,365 B1 | 7/2002 | Potekev et al. | |
| 6,485,145 B1 | 11/2002 | Cotton et al. | |
| 6,517,210 B2 | 2/2003 | Peterson et al. | |
| 6,594,090 B2 | 7/2003 | Kruschwitz et al. | |
| 6,678,095 B2 * | 1/2004 | Kelly | 359/669 |
| 6,719,429 B2 * | 4/2004 | Peterson | 353/69 |
| 2003/0107714 A1 | 6/2003 | Cheng | |

* cited by examiner

Primary Examiner—Christopher Mahoney (57) ABSTRACT

A technique is described to reduce overfill of light that has exited a light integrating device and is applied to an optical modulator in the form of an illuminating pattern. The illumination reduction technique makes the illuminating pattern more closely conform to a active planar surface of the optical modulator by at least partially providing anamorphic magnification of the illuminating pattern.

22 Claims, 6 Drawing Sheets

OVERFILL REDUCTION FOR AN OPTICAL MODULATOR

FIELD OF THE INVENTION

The invention generally pertains to optical modulators, and more specifically to system and methods for increasing the percentage of light that is applied to optical modulators which is received by an active modulating surface.

BACKGROUND

Light that passes beyond the active reflective surface of an optical modulator is referred to as overfill. This overfill accounts for a considerable percentage of the light (and associated energy) that escapes use from those optical modulators used in optical projectors and optical displays. Overfill results from applying a two-dimensional illumination pattern of light that does not match the size and aspect ratio of a reflective surface of the optical modulator. Overfill is light that is directed at an active surface of the optical modulator but does not contact the active surface. The overfill light can scatter in an uncontrolled manner when interfering with the projected image or signal from the optical modulator, and can thereby degrade the quality of the projected image or signal. Any scattered light falling in the active reflective surface of the optical modulator will also get imaged on the screen, thereby degrading the contrast of the projected image.

As such, it is desired to be able to reduce overfill of the light that is applied across an optical modulator.

BRIEF DESCRIPTION OF THE DRAWINGS

Illustrative and presently preferred embodiments of the invention are shown in the drawings, in which.

DETAILED DESCRIPTION

Optical modulators are often used in such fields as optical projectors and optical displays. This disclosure provides a mechanism to more evenly illuminate optical modulators, and to reduce the amount of unusable light, e.g. overfill, that is directed at optical modulators. Overfill is considered light that is directed at an optical modulator, and which passes beyond the active reflective surface of the optical modulator. Overfill accounts for a considerable percentage of the wasted light (and therefore a considerable amount of wasted energy) associated with prior art optical modulators. Prior art attempts at reducing overfill often have resulted in uneven illumination of the optical modulators.

Figure 1:
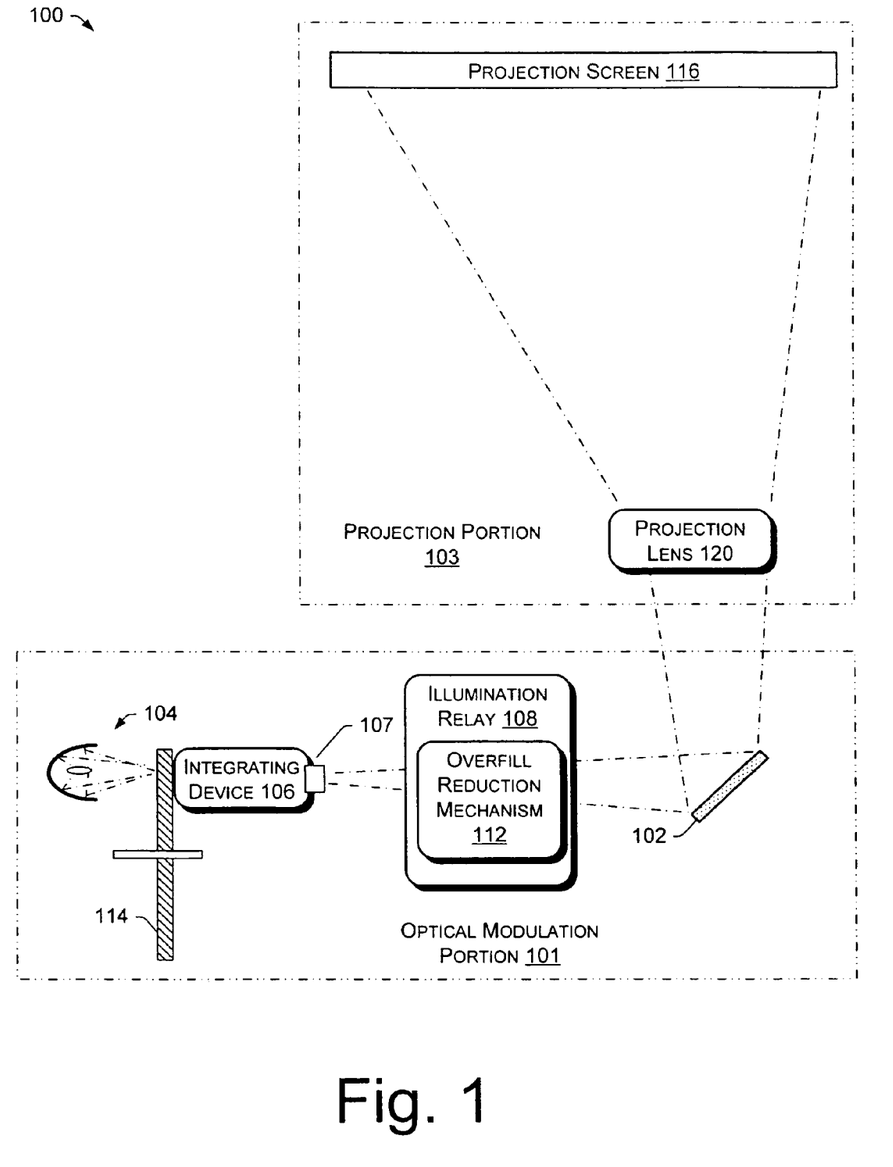
FIG. 1 is a top schematic diagram of one embodiment of an optical assembly including an overfill reduction mechanism that conforms the positioning of light to an active reflective surface of an optical modulator.

FIG. 1 provides a top schematic diagram of an embodiment of the optical assembly 100 that images the optical modulator 102 in a manner that reduces overfill. One embodiment of the optical assembly 100 includes an optical modulation portion 101 that includes those components that allow the optical modulator 102 to image a two-dimensional image in the form of a two-dimensional illumination pattern; and a projection portion 103 that images light from the optical modulator 102.

One embodiment of the optical modulation portion 101 includes the optical modulator 102, a light source 104, an integrating device 106 (including an integrating device exit 107), a color wheel 114, and an illumination relay 108. Light from the light source 104 passes through the integrating device 106, the color wheel 114, and the illumination relay 108 into the optical modulator 102. The illumination relay 108 includes an overfill reduction mechanism 112 that reduces overfill from that applied to the optical modulator 102. The integrating device 106 homogenizes the light, and directs the light into an illumination relay 108. The illumination relay 108 images a plane of the integrating device 106 (at the end of the integrating device) to the optical modulator 102.

Various embodiments of the integrating device 106 are formed as (but are not limited to) an integrating tunnel, a rod condenser lens, or a fly's eye condenser lens. The integrating device 106 is formed with the integrating device exit 107 in the form of an aperture having a prescribed shape and an aspect ratio from which the integrated light that forms an image is directed. The illumination relay 108 images a plane of light at the integrating device exit 107 onto the optical modulator 102 (which takes the form of an illumination pattern at the optical modulator). By using this illumination pattern, the optical modulator creates a desired output image using modulation techniques.

While this disclosure describes an optical modulator that is being applied to an optical projector or display, it is to be understood that the concepts applied to the optical modulation portion 101 can be applied to a variety of different optical modulator devices. For example, certain embodiments of the optical modulation portion 101 can be applied to a variety of applications such as with different embodiments of projection portions 103, different embodiments of communication systems, different embodiments of computer systems, etc. The embodiments of the optical modulation portion as described herein are intended to decrease overfill and make the light applied to different segments of the optical modulator more uniform regardless of the function of the optical modulator. The overfill reduction concepts as described with respect to this disclosure can be applied to any of a large variety of optical modulators (such as those that are commercially available) in which an illumination pattern is imaged by the projection portion 103.

The optical modulation portion 101 can be applied to a variety of projection portions 103. The embodiment of the projection portion 103 of FIG. 1 includes a projection lens 120 and the projection screen 116. In certain embodiments, the projection lens 120 images the plane (light output) of the optical modulator 102 onto a destination location such as an optical projection screen 116 (which may be configured as an optical projector or an optical display). The reflective and illuminated portion of the optical modulator is thereby projected as an image of the optical modulator on a viewing screen (such as a back-lit or front-lit projection screen or display).

Ensuring that the optical modulator is evenly illuminated improves the quality and uniformity of the image projected on the projecting screen 116. While the embodiment of the projection portion 103 as shown in FIG. 1 is a front-lit projection system, it is envisioned that the optical modulation portion 101 concepts disclosed herein can be applied to either front-lit or back-lit projectors, or front-lit or back-lit displays.

One application of the optical modulator 102 is for optical projection and displaying; such as used for home video projectors, theater projectors, High Definition Television (HDTV), etc. Various embodiments of optical modulators include, but are not limited to, digital micro-mirror device (DMD), liquid crystal display (LCD), and Liquid Crystal on Silicon (LCoS). Different embodiments of optical modulators 102 rely either on optical reflection or transmission.

In general, optical modulators 102 spatially distribute any incident light applied thereto. Several embodiments of the optical modulator 102 as described with respect to FIG. 2 consist of large number of segments 202 that independently modulate light and create patterns or images (many optical modulators numerically contain hundreds or thousand of segments 202). All of the segments 202 of the optical modulator 102 combine to create a planar active surface 204 (e.g., an imaged plane) of the optical modulator 102 (as illustrated within the dotted line referenced by the reference character 204).

Figure 2:
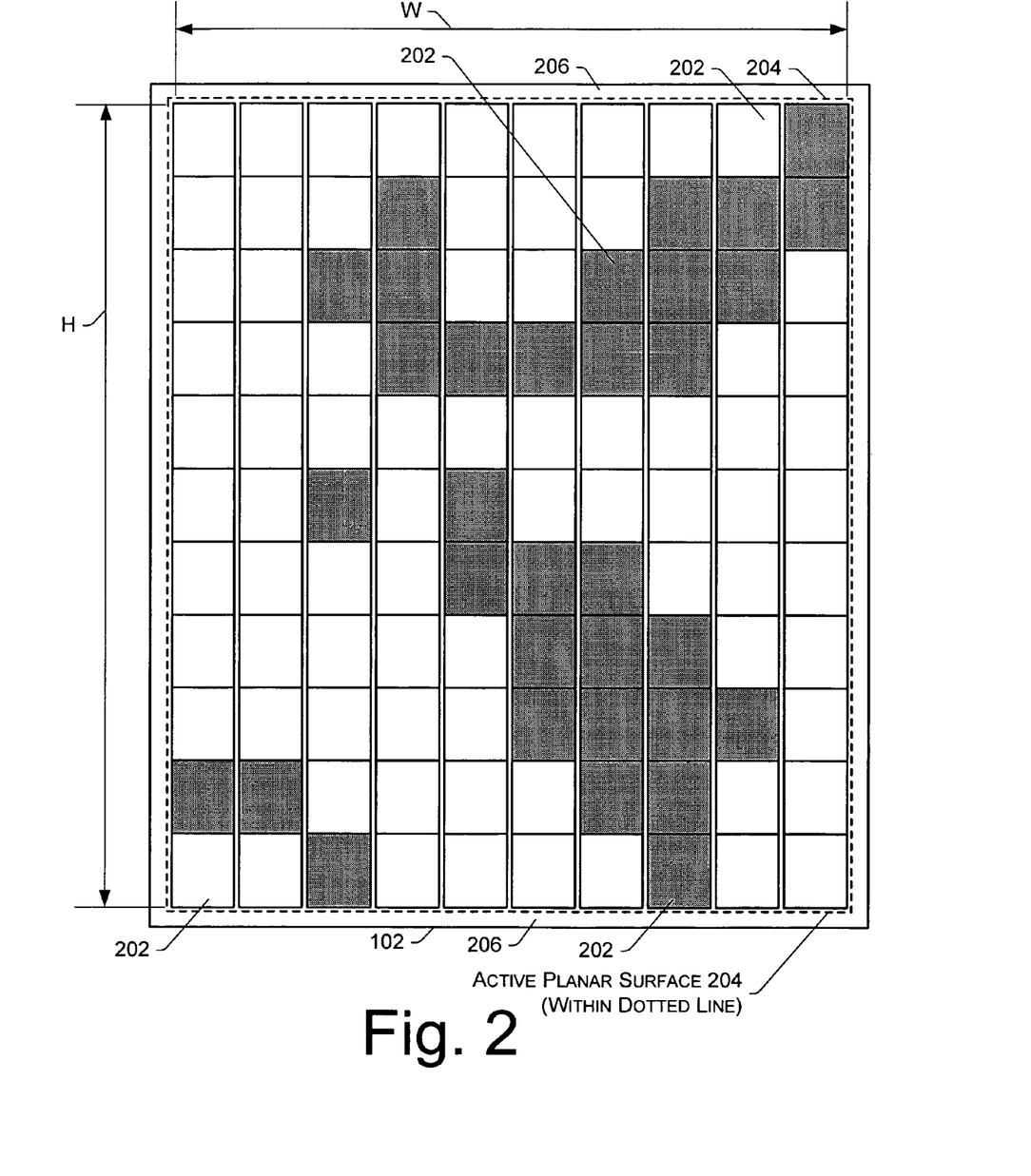
FIG. 2 is a front view of one embodiment of the optical modulator as shown in the optical assembly of FIG. 1.

Different embodiments of the optical modulator 102 can use different embodiments of segments 202 to modulate light in a different manner. In one embodiment, each segment is always reflective, and each segment can be displaced between a first position in which the segment acts to reflect light to the projection portion 103 (corresponding to an on state), and a second position in which the segment acts to dump its light to some remote location (corresponding to the off state).

In another embodiment of the optical modulator 102 as described with respect to FIG. 2, each segment is controllably altered between an optically reflective state in which light from that segment is directed to within the plane of the optical modulator to provide a brightly illuminated portion to be imaged by the projection portion 103, and a transmissive state in which light from that segment is transmitted through the optical modulator away from the plane of the optical modulator to provide a darkly illuminated portion to be imaged by the projection portion 103. Any other suitable embodiment of optical modulator 102 that has a modulating surface that modulates light is within the intended scope of the present disclosure. Any of the known optical modulation techniques which include, but are not limited to, optical reflection, optical diffraction, optical polarization, changing of optical frequencies, changing of optical phase, and changing of frequency modulation are within the intended scope of the present disclosure.

The planar active surface 204 is formed from all of the segments that are controllably displaced between a first state in which light from that segment is directed towards the projection lens 120 as indicated by the bright segments 202 in FIG. 2; or alternatively a second position in which light from that segment is directed away from the projection lens 120 as indicated by the darkened segments 202 in FIG. 2. Lateral of the planar active surface 204 is a thin border 206 that is formed from optically absorbent material, and thereby absorbs a thin volume of illumination light that is directed at the optical modulator 102, but falls outside of the planar active resurface 204.

To create color images, at any instant of time the color of the lens of the color wheel through which light passes on its way to the optical modulator is synchronized with the state (e.g., position of all the segments 202 that are turned on) of the optical modulator 102 for that color of light. With each modulated color image, the color of the lens of the color wheel 114 is synchronized with the state of the segments on the optical modulator that corresponds to that color. As such, the color wheel 114, the illumination relay 108, and the optical modulator 102 together creates an image of any color (e.g., red, green, or blue) that appears on an output plane of the optical modulator 102 to be imaged by the projection portion 103. Each color is imaged for a brief duration, and then followed by another color. In this manner, images of the different colors are displayed on the projection portion 103 in a rapidly cyclical manner at such a rate that the cycling of the colors is not discernible by human eyes.

To provide an efficient illumination of the optical modulator 102, the illuminating pattern of light applied to the optical modulator by the optical modulation portion 101 completely fills, and yet does not overfill far beyond, the lateral boundaries of the planar active surface 204 on the optical modulator. If the optical modulation portion 101 does not completely illuminate the planar active surface 204, then adequate illuminating light will not be applied to certain segments 202. If the optical modulation portion 101 illuminates outside of the planar active surface 204 and the border 206, then overfill results.

Such overfill is not only wasteful of light and its associated energy, but also contributes to optical noise in the projected image on the screen 116 by scattering such overfill light around the proximity of the optical modulator 102. Depending on the direction that the overfill light is directed, the overfill light is thereby imaged onto the projection screen (in addition to the pattern of light that is transmitted from the optical modulator the projection portion 103) to create this optical "noise".

This disclosure provides a mechanism for reducing the amount of overfill by sizing the illumination pattern of light that is applied to the optical modulator to more closely match the outline of the planar active surface 204 of the optical modulator 102. This reduction of overfill is accomplished in one embodiment of the disclosure by providing one or more of the following adjustments that within this disclosure are each intended to contribute to the overfill reduction mechanism 112.

a) Spatially adjusting the position of the centration of the illumination pattern (that is applied to the optical modulator 102 from the optical modulation portion 101) to correspond to the centration of the planar active surface 204 of the optical modulator. This spatial adjustment is accomplished with a lens structure (e.g., a glass offset plate 402 as described with respect to FIG. 4) that acts as a spatial centration adjustment portion 302 of the overfill reduction mechanism 112 of FIG. 3;

b) Spatially adjusting the size of the illumination pattern applied to the optical modulator (e.g. using a magnification component) to correspond to the size of the planar active surface 204 of the optical modulator. This sizing adjustment is accomplished with a lens structure that acts as a spatial magnification adjustment portion 304 of the overfill reduction mechanism 112 of FIG. 3 (which includes, e.g., the zoom mechanisms 404 and 406 as described with respect to FIG. 4); and/or c) Spatially adjusting the aspect ratio (the height H divided by the width W as shown in FIG. 2) of the illumination pattern applied to the optical modulator to correspond to the aspect ratio of the planar active surface 204 of the optical modulator. This is accomplished using a lens structure that acts as a spatial aspect ratio adjustment portion 306 of the overfill reduction mechanism 112 of FIG. 3 (e.g., anamorphic magnification mechanism 408 as described with respect to FIG. 4).

Figure 3:
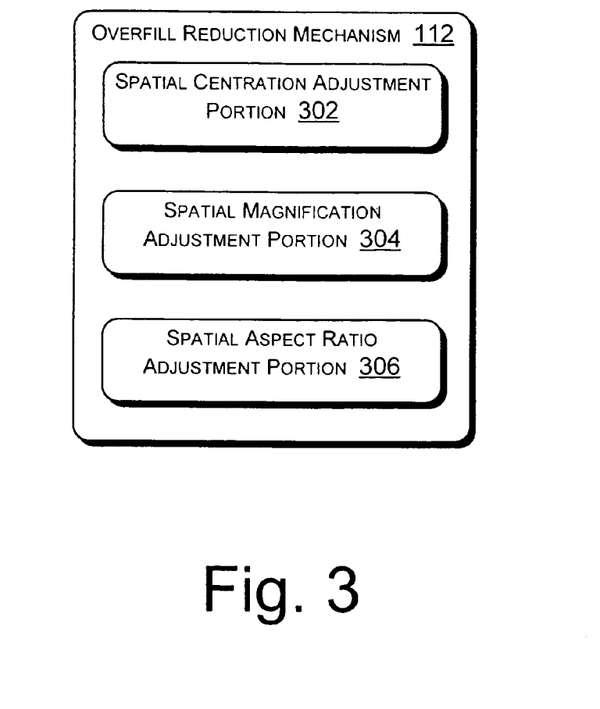
FIG. 3 is a block diagram of one embodiment of an overfill reduction mechanism as shown in the optical assembly of FIG. 1.

This disclosure thereby provides a number of embodiments of the overfill reduction mechanism 112 that is formed from different embodiments of the spatial centration adjustment portion 302, the spatial magnification adjustment portion 304, and/or the spatial aspect ratio adjustment portion 306 to perform each respective operation. Within this disclosure, the different embodiments of the spatial centration adjustment portion 302, the spatial magnification adjustment portion 304, and/or the spatial aspect ratio adjustment portion 306 can be used individually, or in combination with one or two of the other portions 302, 304, and 306 that are included within the overfill reduction mechanism 112. Each portion 302, 304, and 306 of the overfill reduction mechanism 112 acts to reduce overfill by more closely matching the two-dimensional outline of the illumination pattern applied to the optical modulator with the two-dimensional outline of the planar active surface 204 of the optical modulator. In one embodiment, the components of the portions 302, 304, and/or 306 included within the overfill reduction mechanism 112 as described can be formed using relatively inexpensive molded glass optical components that are formed using known mass-production techniques. The alignment of the components of the portions 302, 304, and/or 306 can be automated since this requires relative rough positioning of the optical components, and not more precise machining of the exit aperture of the integrating device 106 as with certain conventional aspect ratio adjustment mechanisms.

One conventional technique that attempts to match the actual centration, size, and aspect ratio with the designed centration, size, and aspect ratio involves combining an appropriately dimensioned and shaped integrating device exit with the illumination relay having a fixed magnification (considering the magnification is the ratio between the size of the optical modulator and the integrating device exit). Unfortunately, due to different optical device layouts that house the prior art optical systems, the shape and size of the integrating device exit has to be configured for each differently configured optical device. In addition, considering the manufacturing tolerances and dimensions of the integrating device exit; the tight tolerances of the illumination relay; and the tight alignment between the integrating device; the illumination relay, and the optical modulator to provide proper operation, the process of making such devices are relatively expensive and time consuming.

This disclosure describes different embodiments of the dynamically-configurable overfill reduction mechanism 112 that relies on the inter-operation of the integrating device and/or the illumination relay 108 of the present disclosure to control the magnification adjustment, the centration adjustment, and/or the aspect ratio adjustment to conform the illumination pattern imaged on the optical modulator with the active modulating surface of the optical modulator. Such magnification adjustment, centration adjustment, and aspect ratio adjustment ensures that the entire optical modulator is substantially properly illuminated, and greatly reduces the overfill light that passes beyond the lateral boundaries of the optical modulator.

Figure 4:
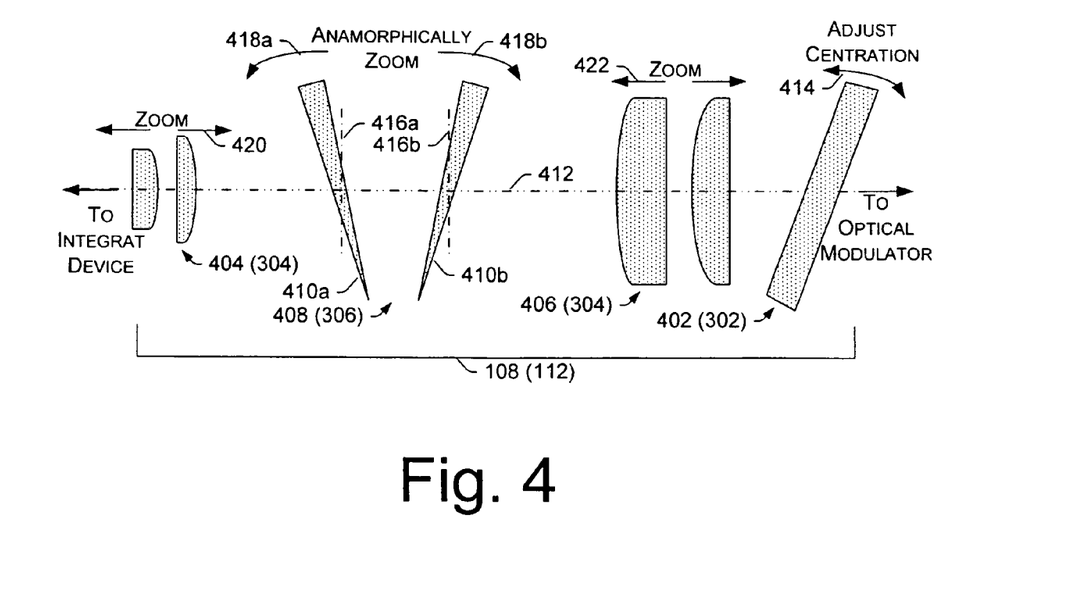
FIG. 4 shows a cross-sectional view of one embodiment of the overfill reduction mechanism of FIG. 3.

This disclosure provides an embodiment of the overfill reduction mechanism 112 as shown in FIGS. 3 and 4 by which the centration, magnification and aspect ratio of the light actually applied to the optical modulator is modified to approach the designed centration, size and the aspect ratio of the optical modulator. FIG. 4 shows one embodiment of overfill reduction mechanism in which a pair of similar prisms 410a and 410b is used to anamorphically magnify the illumination pattern 506. The rotation of prisms 410a and 410b as described with respect to FIG. 4 will change the magnification perpendicular to the optical axis 412.

One embodiment of the overfill reduction mechanism 112 as shown in FIG. 4 consists of lens structures to perform each operation of the spatial centration adjustment portion 302, the spatial magnification adjustment portion 304, and the spatial aspect ratio adjustment portion 306 as shown in FIG. 3. The overfill reduction mechanism 112 as described with respect to FIG. 4 thereby contains a variety of optical adjustment devices that are intended to be illustrative in nature, and not limiting in scope. Different embodiments of the optical mechanisms associated with the overfill reduction mechanism 112 includes one or more of a glass offset plate 402, a pair of zoom mechanisms 404 and 406, and an anamorphic magnification mechanism 408. Such adjustments can be performed optically, mechanically, electronically, or a combination thereof; and such adjustment devices include glass, semiconductor, air, or other known imaging materials.

One embodiment of the spatial centration adjustment portion 302 of FIG. 3 includes a glass offset plate 402 is described with respect to FIG. 4. The glass offset plate 402 is rotated as indicated by an arrow 414 to vertically center the image from the integrating device 106 of FIG. 1 to align the center of the projected image with the center of the optical modulator 102. The more that the glass offset plate is rotated as indicated by the arrow 414, the further away from the axis 412 that the image will be displaced. The glass offset plate displaces the image plane in the desired rotated direction by rotating the plate in that direction.

One embodiment of the spatial magnification adjustment portion 304 of FIG. 3 that is described with respect to FIG. 4 includes a number of zoom mechanisms 404 and 406 within the illumination relay that magnifies the illumination pattern as applied to the optical modulator by a desired and controllable amount. Such zoom mechanisms provide for magnification of the image by an equal percentage in any direction taken within the plane of the zoom mechanism. The two pairs of zoom mechanisms 404 and 406 together can be considered as operating as a single higher-power optical magnifying lens. Considering the relative dimensions of the integrating device exit 107 and the optical modulator 102, a considerable amount of magnification of the illumination pattern may be applied by the zoom mechanisms 404 and 406, thereby involving a number of magnification stages in certain instances.

In one embodiment, the zoom mechanism 404 is optically located ahead of the anamorphic prism assembly 408 while the second zoom mechanism 406 is optically located after the anamorphic prism assembly 408. As generally known with optics, with illumination relays the dimensions of latter magnification lenses are typically larger than earlier magnification lenses to zoom an already magnified light signal that is transmitted from the light integrating tunnel 106.

In one embodiment as shown in FIG. 4, each zoom mechanism 404, 406 is formed from two lenses. In one embodiment, one or both of the two lenses of each zoom mechanism 404, 406 is mounted on a cam or other actuator (not shown) to provide relative displacement between the lenses as shown by arrows 420 and 422 in FIG. 4. Such relative displacements allow for precise and controllable changes in magnification, thus implementing an effective zoom mechanism. The particular configurations of the magnification lenses 404, 408, the overfill reduction mechanism 112, and the optical modulator 102 is intended to be illustrative in nature, and not limiting in scope.

By sufficiently magnifying the area on the optical modulator 102 that is illuminated (using the integrating device 106 and the illuminating relay 108 of FIG. 1), the zoom mechanisms 404 and 406 of FIG. 4 (that may act to increase or decrease the size of the projected illumination pattern) ensure that the entire targeted region of the planar active surface 204 on the optical modulator 102 is fully illuminated as the illuminated portion. As the magnification of the illuminated portion to the optical modulator 102 is increased by the zoom mechanisms 404 and 406 of the overflow reduction mechanism 112, any overflow is also magnified.

One embodiment of the spatial aspect ratio adjustment portion 306 of FIG. 3 that is described with respect to FIG. 4 includes the anamorphic magnification mechanism 408 that controls the anamorphic magnification of the illumination pattern that is applied to the optical modulator 102 along one orthogonal axis while maintaining the magnification of the illumination pattern in the other orthogonal axis of the optical modulator 102. The term "anamorphic" within this disclosure is considered as relating to one axis only. The anamorphic magnification mechanism 406 thereby reduces magnification and decreases any overfill along only one orthogonal axis of the optical modulator 102 (which is typically selected to be that axis with the greatest percentage of overfill) while maintaining the magnified state along the other optical axis. The anamorphic magnification mechanism is adjusted in an arbitrary direction by rotating the anamorphic prism assembly about an axis that is perpendicular to the direction that the plane is being magnified.

For example, if the height measurement of the aspect ratio of an illuminating pattern is being shortened using the overfill reduction mechanism as shown in FIG. 4, then the respective anamorphic prisms 410*a* and 410*b* of the anamorphic prism assembly is rotated outwardly in a direction as shown by the respective arrows 418*a* and 418*b* about a plane extending into the paper in FIG. 4. Rotating the anamorphic prisms inwardly in a reversed direction to that as indicated by the arrows 418*a* and 418*b* will inversely result in increasing the aspect ratio of the illuminating pattern.

An assembly mechanism (not shown) is provided for rotating the anamorphic prisms 410*a*, 410*b* about either one or both of the orthogonal axes about which the anamorphic prisms are adjusted. As such, the anamorphic prisms 410*a* and 410*b* are rotated about a pair of axes going into the paper (not shown) in the direction indicated by the arrows 418*a* and 418*b*, or alternately the anamorphic prisms are rotated about axes indicted respectively as 416*a* and 416*b* to adjust either the vertical or horizontal dimension included in the aspect ratio. The described orthogonal axes of adjustment both extend perpendicular to the axis of symmetry 412 of the anamorphic prism that passes through the anamorphic prisms 410*a* and 410*b*.

The assembly of the anamorphic prisms 410*a* and 410*b* into an anamorphic prism assembly are automatically assembled into the illumination relay 108 as shown in FIG. 1 using known mechanical assembly techniques. In fact, the anamorphic prism assembly are positioned anywhere between the integrating device exit 107 and the optical modulator 102 of FIG. 1. A housing (not shown) is provided about the illumination relay 108 as shown in FIG. 4 to secure, provide adjustment mountings for, and protect the associated anamorphic prisms 410*a* and 410*b* and the lenses. A similar adjustable overfill reduction mechanism 112 using the anamorphic prism assembly is formed within the optical devices having different configurations, layouts, and functions.

The illumination patterns of FIGS. 5, 6, 7, and 8 are now described with respect to specified adjustments of the different components of the overfill reduction mechanism 112 of FIGS. 1 to 4. A variety of illumination patterns 506 are shown in FIGS. 5 to 8. Each illumination pattern 506 is modified (using the overfill reduction mechanism) from the illumination pattern in the other figures as described with respect to that particular figure.

When the optical modulator 102 is illuminated by imaging the exit of the integrating device 106 as shown in FIG. 1 using the overfill reduction mechanism 112, it is important to ensure that the entire planar active surface 204 (as shown in FIGS. 2, 5, 6, 7, and 8) on the optical modulator 102 is illuminated by an illumination pattern 506 that is applied to the optical modulator, and also that overfill is reduces as much as possible.

Figures 5, 6:
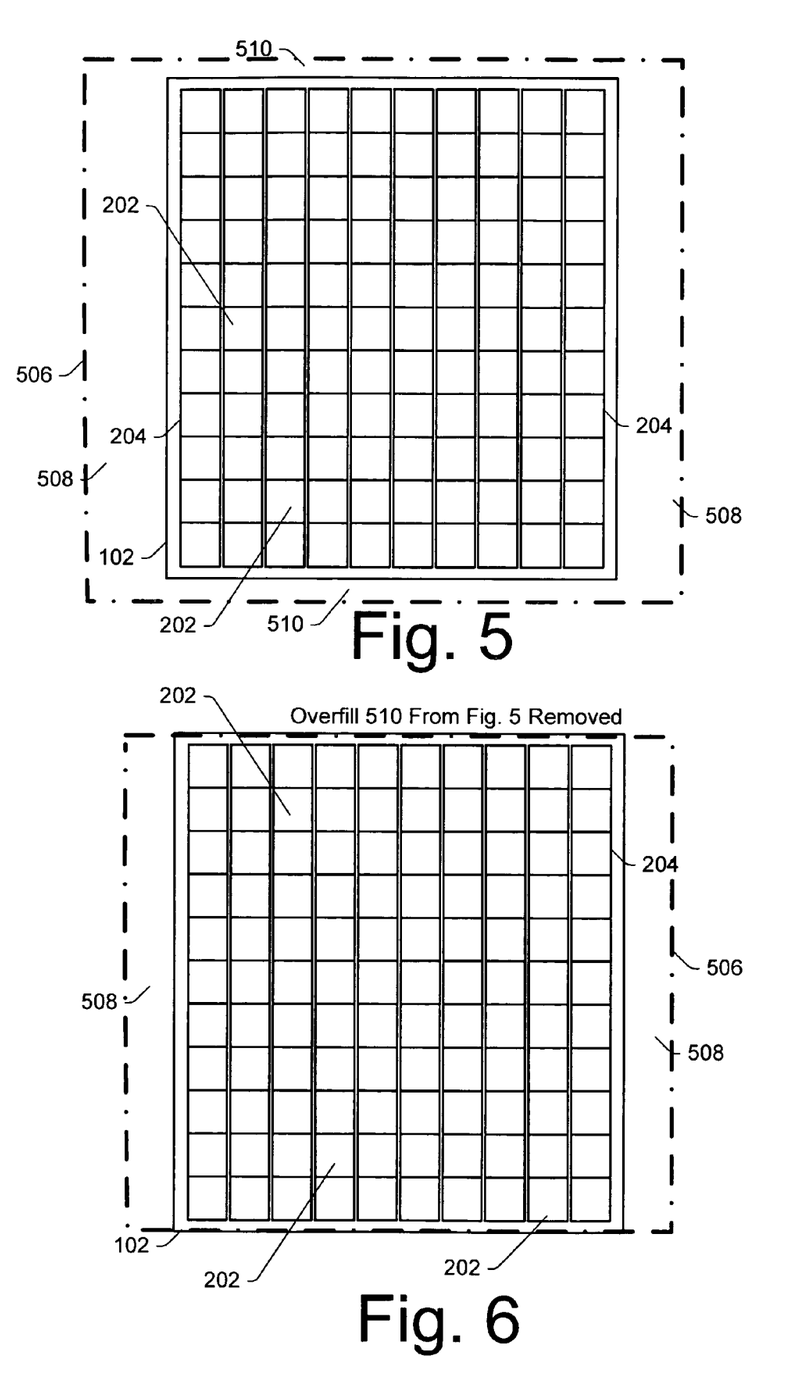
FIG. 5 shows a front view of the optical modulator of FIG. 2 in which the applied illumination pattern differs in planar magnification and aspect ratio from that of an active reflective surface of the optical modulator.
FIG. 6 shows a front view of the optical modulator of FIG. 2 in which the aspect ratio of the illumination pattern differs from that of the active reflective surface of the optical modulator.

FIG. 5 displays an illumination pattern on the optical modulator 102 in which both the actual magnified size and the actual aspect ratio of the illumination pattern 506 of the optical modulator 102 is different from the respective desired size and desired aspect ratio of the planar active surface 204 of the optical modulator 102. As a result, there are overfill locations 508 and 510 that extend laterally of the planar active surface 204 in two axial directions as shown in FIG. 5. The resulting overfill light in the overfill regions 508 and 510 accounts for a loss of useful light, and contributes to noise by scattering the light around the proximate area of the optical modulator in a direction that may be imaged by the projection portion 103 as shown in FIG. 1.

Between FIGS. 5 and 6, the spatial magnification adjustment portion 304 of the overfill reduction mechanism 112 is adjusted to decrease the magnification of the planar illumination pattern as applied to the optical modulator 102 along both axes (e.g., by reducing the zoom of one or both of the zoom mechanisms 404 and 406) to remove the overfill 510 in the vertical direction, while reducing the horizontal overfill 508. If the reduction in magnification by the zoom mechanism (404 and/or 406) is too great, certain segments 202 within the planar active surface 204 will not be fully illuminated. If the reduction in magnification by the zoom mechanism (404 and/or 406) is too low, then there will still be overfill 510 and 508 along both axes. If the reduction in magnification by the zoom mechanism (404 and/or 406) is correct, then there will be reduced overfill 508 along one axis only, and that reduced overfill is corrected by the anamorphic magnification mechanism 408 as described with respect to FIGS. 6 and 7.

Following operation of the spatial magnification adjustment portion 304 as described with respect to FIGS. 3 and 4, some overfill 508 still exists in the planar active surface 204 along a single axial direction within the optical modulator 102. For instance as shown in FIG. 6, considerable overfill 508 remains for the illumination pattern 506 in the horizontal direction that can be reduced using the overfill reduction technique as described in this disclosure. Whichever direction has any (or the greatest amount of) overfill will benefit the most from reducing the dimensions of the illumination pattern 306 along that axis.

Figure 7:
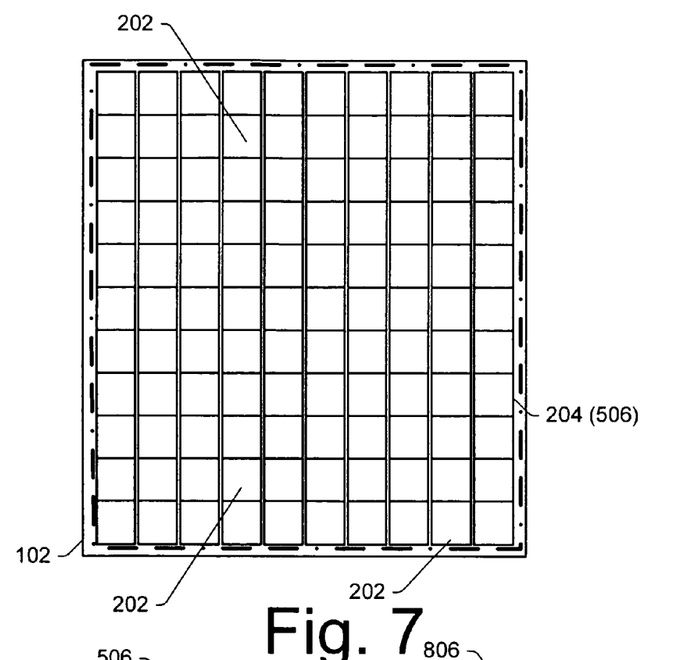
FIG. 7 shows a front view of the optical modulator of FIG. 2 in which the size, the centration, and the aspect ratio of the illumination pattern match that of the active reflective surface of the optical modulator.

The embodiment of the overfill reduction mechanism 112 as described with respect to FIG. 4 is formed to provide an anamorphic magnification (or reduction) as shown between FIGS. 6 and 7 to make the illumination pattern 506 more closely conform to the active region of the optical modulator. Such anamorphic magnification (or reduction) uses the spatial aspect ratio adjustment portion 306 as described with respect to FIGS. 3 and 4. While the zoom mechanisms 404 and 406 each magnify the illumination pattern 306 an equal percentage in the two axial directions of the illumination pattern, the anamorphic magnification mechanism allows for magnification (or reduction) of the illumination pattern 506 in only one axial direction (e.g., horizontal as shown in FIG. 6) to reduce overfill in that direction, while anamorphically maintaining the dimensions of the illumination pattern 506 in its other direction (e.g., vertical as shown in FIG. 6). FIGS. 6 and 7 thus show how the anamorphic magnification mechanism is able to reduce the overfill of the FIG. 6 illumination pattern 506 in one (e.g., horizontal) direction, while maintaining the dimension of the illumination pattern in another (e.g., vertical) direction.

Figure 8:
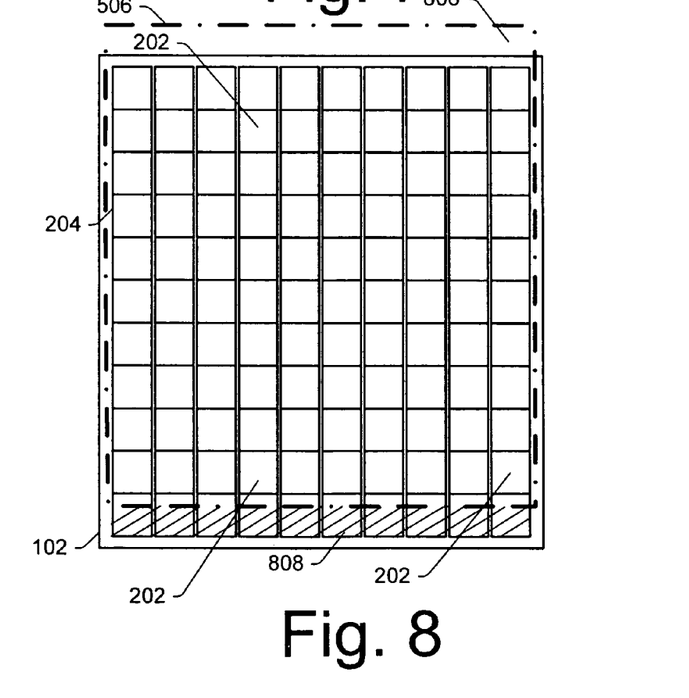
FIG. 8 shows a front view of the optical modulator of FIG. 2 in which the centration of the illumination pattern differs from that of the active reflective surface of the optical modulator.

As such, the use of such an overfill reduction mechanism 112 can thereby significantly reduce the overfill of the optical modulator, while maintaining roughly uniform intensity of the light applied across the active area 302 of the optical modulator. The use of the overfill reduction mechanism 112 reduces offset in a variety of ways including, but not limited to, adjusting the position of the integrating device 106, adjusting the position of the optical modulator 102, or applying the glass offset plate 402 (as shown in FIG. 4 in the illumination path or in FIG. 11 by itself) tilted to provide an adjustable amount of offset with respect to the axis 412. FIGS. 7 and 8 show the type of adjustment that is permitted by tilting the glass offset plate 402 that adjusts the location of the centration (e.g., planar center) of the illumination pattern compared with the centration of the active portion of the optical modulator. The progression from FIG. 7 to FIG. 8 shows the centration of the illumination pattern 506 of the optical modulator moving in a general upward direction compared to the active region of the optical modulator. In general, the thicker the glass offset plate 402, the greater the illumination pattern displacement given a particular angle of the glass offset plate. The movement of the glass offset plate 11 between the positions of the illumination pattern as shown in FIGS. 7 and 8 results in providing (or increasing) an offset portion 806 above the active region of the optical modulator, and establishing a reduced illumination portion 808 within a lower segment of the optical modulator.

Figure 9:
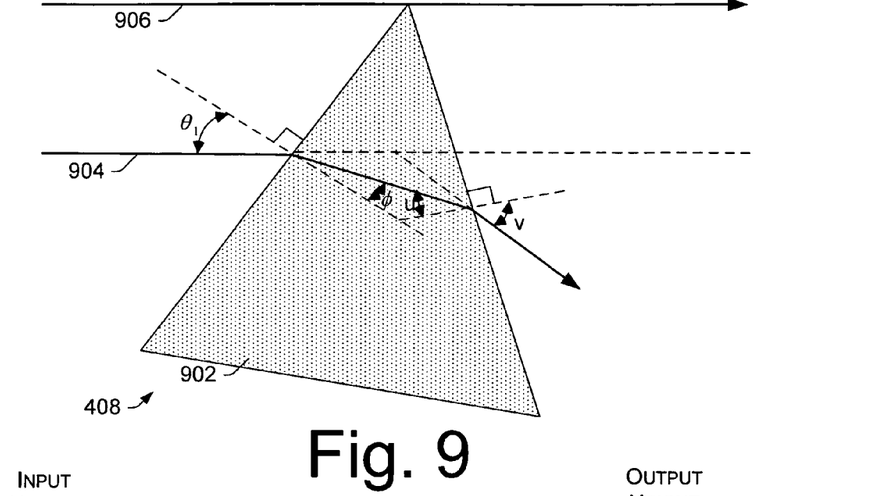
FIG. 9 shows a side view of a single prism that is used as one embodiment of an anamorphic magnification mechanism as shown in FIG. 4.
Figure 10:
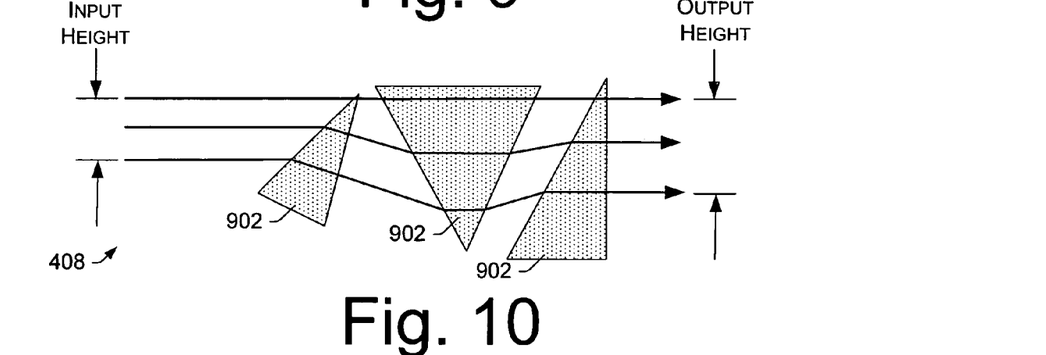
FIG. 10 shows a side view of three prisms that is used as another embodiment of an anamorphic magnification mechanism as shown in FIG. 4.

FIGS. 9 and 10 illustrate two embodiments of the anamorphic magnification mechanism 408 as described with respect to FIG. 4 that anamorphically magnify the illumination pattern as applied to the optical modulator 102. These figures illustrate several embodiments of anamorphic beam expanding techniques involving prisms. In the FIG. 9 embodiment, the anamorphic magnification mechanism 408 includes a single prism 902. The anamorphic magnification (M) of light traveling through a single prism as indicated by light rays 904 and 906 is given by the equation 1. The thickness of the single prism 902 as taken in the direction into the paper (and other prisms shown in the figures) is considered uniform. Note the construction lines in FIG. 9 are illustrated as dotted lines.

$$M = \frac{\cos\phi}{\cos\theta} \times \frac{\cos v}{\cos u} \qquad (1)$$

The deflection of the light ray 904 in FIG. 9 is illustrative, and is not likely to produce as much anamorphic magnification as illustrated. A variety of configurations of anamorphic magnification mechanisms 408 can also be produced using one, two, three, or more prisms 902 (three prisms are shown in FIG. 10). The magnification M (of the anamorphic magnification mechanisms 408 of FIG. 10 follows equation 2:

$$M = \frac{OutputHeight}{InputHeight}$$

Figure 11:
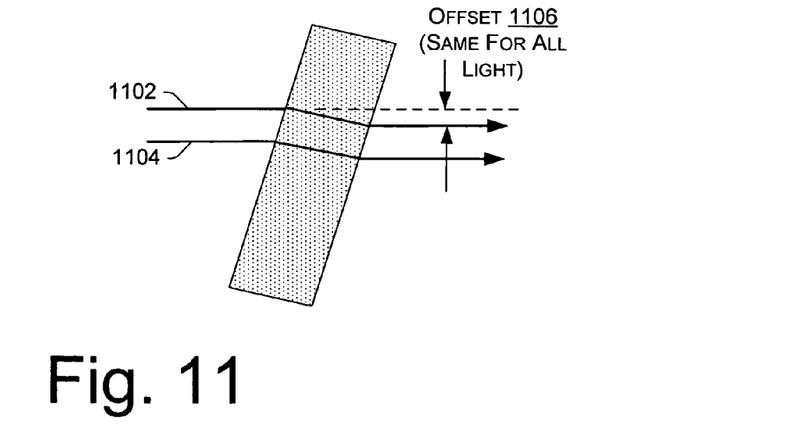
FIG. 11 shows a side view of one embodiment of the glass offset plate as shown in the offset reduction mechanism of FIG. 4.

FIG. 11 provides one embodiment of the glass offset plate 402 of FIG. 4 that acts as the spatial centration adjustment portion 302 of FIG. 3. Light rays 1102 and 1104 that pass through the glass offset plate 402 remain spaced the same distance apart as shown in FIG. 11, and therefore no magnification of the image results. Tilting the glass offset plate 402 in a first direction will create an offset 1106 in the direction that the plate is being tilted. Tilting the glass offset plate in the reverse direction acts to reverse the direction of the offset. This glass plate is mounted on a two-axis tilt mechanism to produce a controllable offset in the directions perpendicular to the tilting axis. The glass offset plate 402 is positioned at any location optically between the integrating device exit 107 and the optical modulator 102 as shown in FIG. 2.

By using the zoom, the anamorphic magnification system and the offset producing mechanism together, a very fine control is provided over the overfill of the illumination pattern of the light to conform to desired region of the optical modulator, thus increasing the overall system efficiency and image quality. Depending upon the situation, the three overfill reduction mechanisms (zoom, anamorphic magnification and offset) may be used in any combination.

The varied embodiments of the overfill reduction mechanism 112 as described with respect to FIGS. 1, 3, and 4 (including different combinations of the spatial centration adjustment portion 302, the spatial magnification adjustment portion 304, and the spatial aspect ratio adjustment portion 306) can be used in combination with a keystone effect reduction mechanism (not shown). The so-called keystone effect results since the optical modulator 102 is angled with respect to the light applied from the illumination relay 108, and therefore light traveling to the upper portion of the optical modulator 102 as shown in FIG. 1 actually travels a greater distance than light traveling to the lower portion of the optical modulator. As such, the magnification from the illumination relay and the resulting magnified width of the illumination pattern applied to the upper portion of the optical modulator is greater than the magnification from the illumination relay and the resulting magnified width of the illumination pattern applied to the lower portion of the optical modulator. This inconsistent magnification causes a rectangular illumination pattern as applied from the integrating device 106 to assume some magnification non-linearities, and thus provide a non-rectangular illumination pattern to the optical modulator 102. These magnification non-linearities that produce the non-rectangular illumination pattern is referred to as the keystone effect.

There are conventional techniques that can be used to modify the keystone effect such as shown in U.S. Pat. No. 6,419,365, entitled "Asymmetrical Tunnel For Spatially Integrating Light" that issued on Jul. 16, 2002 to Potekev et al. Conventional techniques to overcome the keystone effect use configuration changes in the integrating device 106 (e.g., by shaping an exit aperture of an integrating tunnel), or alternatively provide some mechanism in the illumination relay. By using the embodiments of the illumination relay as described in this disclosure that includes the overfill reduction mechanism 112, the conventional techniques can still be used to reduce the keystone effect while the overfill reduction mechanism acts to reduce the effects of overfill.

Having herein set forth preferred embodiments of the present invention, it is anticipated that suitable modifications is made thereto which will nonetheless remain within the scope of the present invention.

What is claimed is:

1. A method of reducing overfill of light that has exited a light integrating device comprising:
    applying to an optical modulator a form of an illuminating pattern;
    providing anamorphic magnification of light forming the illuminating pattern to make the illuminating pattern more closely conform to an active planar surface of the optical modulator; and
    uniformly magnifying the illuminating pattern along two orthogonal axes within the active planar surface.

2. The method of claim 1, further comprising making a centration of the illuminating pattern conform to centration of the active planar surface.

3. The method of claim 1, further comprising projecting light from the optical modulator onto an optical projection screen.

4. The method of claim 1, further comprising using a plurality of anamorphic prisms to anamorphically conform the illumination pattern to the active planar surface of the optical modulator.

5. A method comprising:
    imaging light from an integrating device onto an optical modulator to form an illuminating pattern on the optical modulator; and
    anamorphically modifying an aspect ratio along two orthogonal axes of an active planar surface of the optical modulator to approach a designed device aspect ratio of the optical modulating device, the anamorphically modifying occurs at a location between the integrating device and the optical modulating device.

6. The method of claim 5, further comprising reducing overfill using the anamorphic modification.

7. The method of claim 5, wherein the optical modulator includes one from the group of an optical projector or an optical display.

8. A method, comprising:
    manufacturing an anamorphic aspect ratio modification device to fit within an illumination relay to illuminate an optical modulator, the manufacturing the anamorphic aspect ratio modification device comprising:
        positioning a first prism within the illumination relay, and
        positioning a second prism within the illumination relay in a manner that the second prism is displaced with respect to the first prism.

9. The method of claim 8, further comprising adjusting the first prism with respect to the second prism.

10. The apparatus of claim 9, wherein the illumination relay her comprises a spatial centration adjustment portion that makes a centration of the illuminating pattern more closely conform to a centration of the planar outline of the optical modulator.

11. The apparatus of claim 9, wherein the illumination relay further comprises a planar magnification adjustment portion that makes a planar magnification of the illuminating pattern more closely conform to a planar magnification of the planar outline of the optical modulator.

12. An apparatus, comprising:
    an optical modulator that images light from an integrating device exit via an illumination relay, the light that is being imaged at the optical modulator is in the form of an illuminating pattern; and
    the illumination relay further includes an overfill reduction mechanism that reduces overfill of light that is applied to the optical modulator by making the illuminating pattern more closely conform to a planar outline of the optical modulator along two orthogonal axes of an active planar surface of the optical modulator, in which the overfill reduction mechanism at least partially includes an aspect ratio adjustment portion which more closely conforms the aspect ratio of the illuminating pattern to an aspect ratio of the planar outline of the optical modulator.

13. An apparatus, comprising;
    an overfill reduction means for reducing overfill of light that has exited a light integrating device, wherein the light is applied as an illuminating pattern to an optical modulator; and
    anamorphic magnification means that the illuminating pattern more closely conform to an active outline for the optical modulator along two orthogonal axes of an active planar surface of the optical modulator.

14. The apparatus of claim 13, further comprising a spatial magnification adjustment means for uniformly magnifying the illuminating pattern that is applied in combination with the anamorphic magnification means.

15. The apparatus of claim 13, further comprising a centration adjustment means for adjusting a centration of the illuminating pattern with respect to a centration of an active region of the optical modulator.

16. The apparatus of claim 13, further comprising:
    a spatial magnification adjustment means for uniformly magnifying the illuminating pattern that are applied in combination with the anamorphic magnification means; and
    a centration adjustment means for adjusting a centration of the illuminating pattern with respect to a centration of an active region of the optical modulator.

17. The apparatus of claim 13, further comprising projection means for projecting light from the optical modulator onto an optical projection screen.

18. The apparatus of claim 13, wherein the anamorphic magnification means include a plurality of anamorphic prisms.

19. The apparatus of claim 13, further comprising a color means for controlling the color of the light applied as the illumination pattern to the optical modulator.

20. An apparatus, comprising:

an optical modulation portion that modulates light to be applied to a projection portion, the optical modulation portion includes an optical modulator, an integrating device, and an illumination relay, the optical modulator images light from an exit of the integrating device via the illumination relay, the light that is being imaged at the optical modulator is in the form of an illuminating pattern, the illumination relay comprises an overfill reduction mechanism that reduces overfill of light that is applied to the optical modulator by making the illuminating pattern more closely conform to an active surface of the optical modulator, in which the overfill reduction mechanism at least partially includes an aspect ratio adjustment portion which more closely conforms the aspect ratio of the illuminating pattern to an aspect ratio along two orthogonal axes of the active surface of the optical modulator; and the projection portion images light from the optical modulator to create an image.

21. The apparatus of claim 20, wherein the illumination relay further comprises a spatial centration adjustment portion that makes a centration of the illuminating pattern more closely conform to a centration of the active surface of the optical modulator.

22. The apparatus of claim 20, wherein the illumination relay further comprises a planar magnification adjustment portion that makes the illuminating pattern more closely conform to an active surface of the optical modulator.

* * * * *